(12) United States Patent
Kim et al.

(10) Patent No.: US 10,889,243 B2
(45) Date of Patent: Jan. 12, 2021

(54) REAR ALARM SENSOR ASSEMBLY

(71) Applicants: HYUNDAI MOTOR COMPANY, Seoul (KR); KIA MOTORS CORPORATION, Seoul (KR); YURA CORPORATION CO., LTD., Seongnam-si (KR)

(72) Inventors: Ji Hoon Kim, Daegu (KR); Bo Lim Seo, Suwon-si (KR); Seong Cheol Park, Seongnam-si (KR); Cheol Gi Kim, Gwangmyeong-si (KR)

(73) Assignees: HYUNDAI MOTOR COMPANY, Seoul (KR); KIA MOTORS CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 167 days.

(21) Appl. No.: 16/269,640

(22) Filed: Feb. 7, 2019

(65) Prior Publication Data
US 2020/0148107 A1 May 14, 2020

(30) Foreign Application Priority Data
Nov. 8, 2018 (KR) .................. 10-2018-0136706

(51) Int. Cl.
*B60Q 9/00* (2006.01)
*H01R 13/15* (2006.01)
(Continued)

(52) U.S. Cl.
CPC ........... *B60Q 9/004* (2013.01); *G01D 11/245* (2013.01); *H01R 13/15* (2013.01); *H02G 5/02* (2013.01)

(58) Field of Classification Search
CPC ....... G01D 11/245; G01S 7/524; G01S 15/93; B60Q 9/004; H01R 13/15; H02G 5/02
See application file for complete search history.

(56) References Cited

U.S. PATENT DOCUMENTS

| 10,495,741 B2 * | 12/2019 | Koyama ................. G01S 7/524 |
| 2003/0011177 A1 * | 1/2003 | Yasuhara ............ B60R 21/0136 280/730.2 |

(Continued)

FOREIGN PATENT DOCUMENTS

JP 2005003640 A * 1/2005 ............. G01S 15/93

OTHER PUBLICATIONS

English machine translation of JP2005003640A (Year: 2005).*

*Primary Examiner* — Natalie Huls
(74) *Attorney, Agent, or Firm* — Brinks Gilson & Lione (57) ABSTRACT

A rear alarm sensor assembly includes: a sensing part that generates waves and a sensing signal, based on contents obtained by detecting an approaching object by the generated waves; a controller that generates a transmission signal including the sensing signal and an identifier for identification and transmits the generated transmission signal to a body control module, the controller including a plurality of identification terminals for changing the identifier according to a connection relation and a ground terminal that is grounded; and a determination device that is electrically connected to the ground terminal and moves so as not to be connected to the plurality of identification terminals or so as to be connected to one of the plurality of identification terminals. In particular, the determination device electrically connects the connected identification terminal and the ground terminal to change the connection relation of the plurality of identification terminals.

9 Claims, 12 Drawing Sheets

(51) Int. Cl.
 *H02G 5/02* (2006.01)
 *G01D 11/24* (2006.01)

(56) References Cited

U.S. PATENT DOCUMENTS

| | | | |
|---|---|---|---|
| 2010/0038922 A1* | 2/2010 | Takahashi | B60R 19/483 |
| | | | 293/117 |
| 2012/0056043 A1* | 3/2012 | Inoue | G01S 7/521 |
| | | | 248/27.1 |
| 2018/0239006 A1* | 8/2018 | Kupfernagel | B60R 19/483 |
| 2019/0375359 A1* | 12/2019 | Muhammad | B60R 21/0132 |

* cited by examiner

REAR ALARM SENSOR ASSEMBLY

CROSS-REFERENCE TO RELATED APPLICATION

This application claims priority to and the benefit of Korean Patent Application No. 10-2018-0136706, filed on Nov. 8, 2018, the entire contents of which are incorporated herein by reference.

FIELD

The present disclosure relates to a rear alarm sensor assembly.

BACKGROUND

The statements in this section merely provide background information related to the present disclosure and may not constitute prior art.

In general, a rearview mirror inside the vehicle or a side-view mirror attached to the side of the vehicle is used to see the area behind the vehicle. However, the rearview mirror cannot secure the view of the rear side, and the side-view mirror has a blind spot on a side of the vehicle. Therefore, these mirrors always have a limit in viewing the area behind the vehicle.

Various devices are used to overcome the limit in viewing the rear side and stably ensure the rear view during reverse driving. For example, when a sensor at the back of the vehicle detects an obstacle, an alert sound is provided to a driver. In another example, a camera mounted at the back of the vehicle takes images of an obstacle, and the images are displayed to the driver.

SUMMARY

The present disclosure has been made to solve the above-mentioned problems occurring in the prior art while advantages achieved by the prior art are maintained intact.

An aspect of the present disclosure provides a rear alarm sensor assembly with a ground structure changed.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a rear alarm sensor assembly includes: a sensing part that generates waves and a sensing signal, based on contents obtained by detecting an approaching object by the generated waves, a controller that generates a transmission signal including the sensing signal and an identifier for identification and transmits the generated transmission signal to a body control module, the controller including a plurality of identification terminals for changing the identifier based on a connection relation and a ground terminal that is grounded, and a determination device that is electrically connected to the ground terminal and that moves so as not to be connected to the plurality of identification terminals or so as to be connected to at least one identification terminal of the plurality of identification terminals. In particular, the determination device is configured to electrically connect the at least one connected identification terminal and the ground terminal to change the connection relation of the plurality of identification terminals.

According to another aspect of the present disclosure, a rear alarm sensor assembly installed in a bumper includes a sensing part that generates waves and a sensing signal, based on contents obtained by detecting an approaching object by the generated waves, a controller that generates a transmission signal including the sensing signal and an identifier for identification and transmits the generated transmission signal to a body control module, the controller including a plurality of identification terminals for changing the identifier based on a connection relation and a ground terminal that is grounded, and a plurality of determination devices electrically connected to the ground terminal and connected to at least one identification terminal of the plurality of identification terminals to electrically connect the at least one connected identification terminal and the ground terminal to change the connection relation of the plurality of identification terminals.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Furthermore, in describing exemplary forms of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 1:
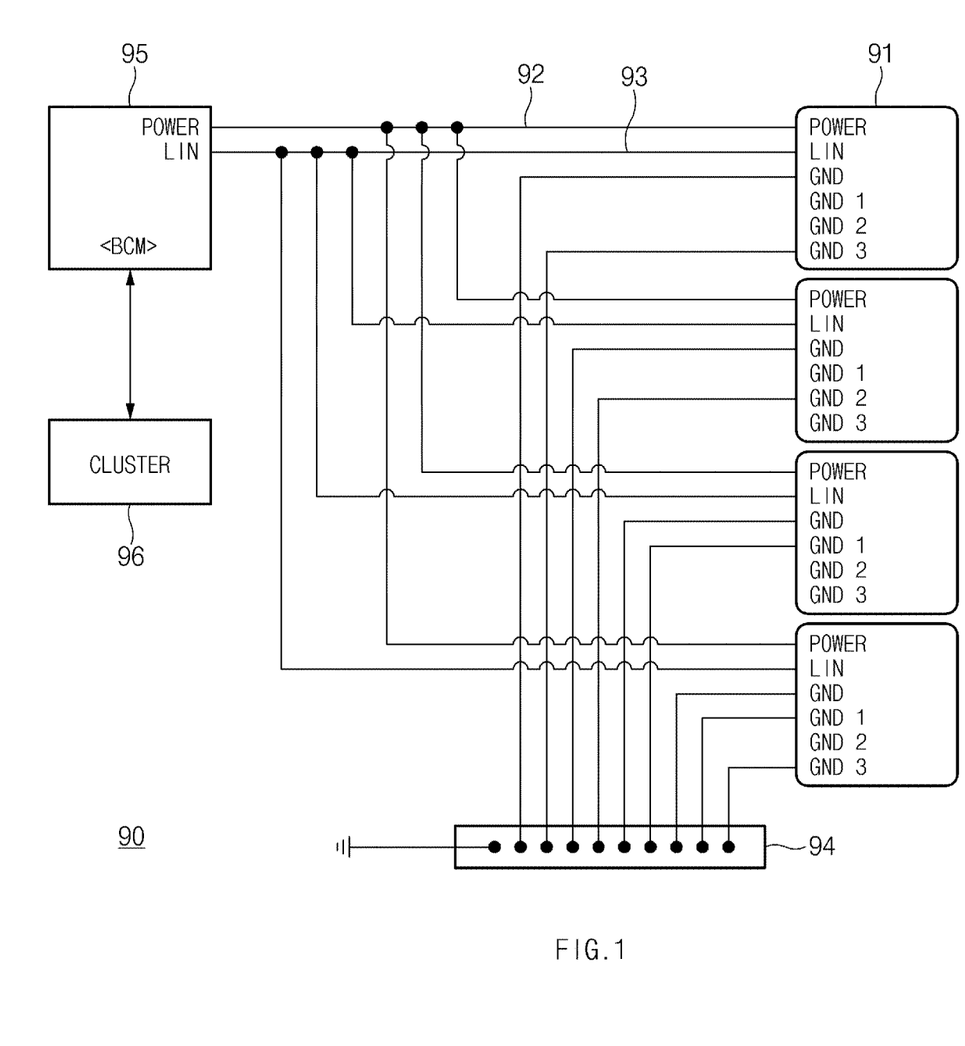
FIG. 1 is a conceptual diagram of an exemplary rear alarm sensor system.

FIG. 1 is a conceptual diagram of an exemplary rear alarm sensor system 90 as one form of the present disclosure.

The rear alarm sensor system 90 illustrated in FIG. 1 may be considered. The rear alarm sensor system 90 may include a body control module (BCM) 95, a plurality of rear alarm sensors 91, and a ground part 94. The rear alarm sensors 91 may receive power from the BCM 95 through interconnection wires 92. The rear alarm sensors 91 may transmit generated transmission signals to the BCM 95 through interconnection wires 93 using local interconnect network (LIN). The BCM 95 may generate a control signal based on the received transmission signals and may transmit the generated control signal to a cluster 96 through controller area network (CAN) communication. The cluster 96 may transmit the control signal to another component of a vehicle, or may generate an alert message and an alert sound, to inform a user of the situation.

Each of the rear alarm sensors 91 may be connected and grounded to the ground part 94 and may have a plurality of ground terminals GND 1, GND 2, and GND 3 in addition to a basic ground GND. The plurality of ground terminals GND 1, GND 2, and GND 3 may serve to make an identifier of the rear alarm sensor 91 disposed at each location. The ground terminals GND 1, GND 2, and GND 3 may be connected to the ground part 94 in various combinations to determine the identifier. For example, the uppermost rear alarm sensor 91 with GND 1 and GND 2 disconnected from the ground part 94 and GND 3 connected to the ground part 94 may have an identifier of 110, and the third rear alarm sensor 91 from the top with GND 1 connected to the ground part 94 and GND 2 and GND 3 disconnected from the ground part 94 may have an identifier of 011. The identifiers may be included in ID FIELDs of headers of transmission signals transmitted to the BCM 95 through LIN communication, and the contents of specific signals may be included in RESPONSEs of the transmission signals. Accordingly, the BCM 95 may recognize that the transmission signals are transmitted from the different rear alarm sensors 91.

However, since each ground terminal is connected to the ground part 94 by a separate ground line as illustrated, the rear alarm sensor system 90 may be large in size, may break down when the connection of the ground terminal is defective, and may be more likely to fail due to a large number of ground lines.

Figure 2:
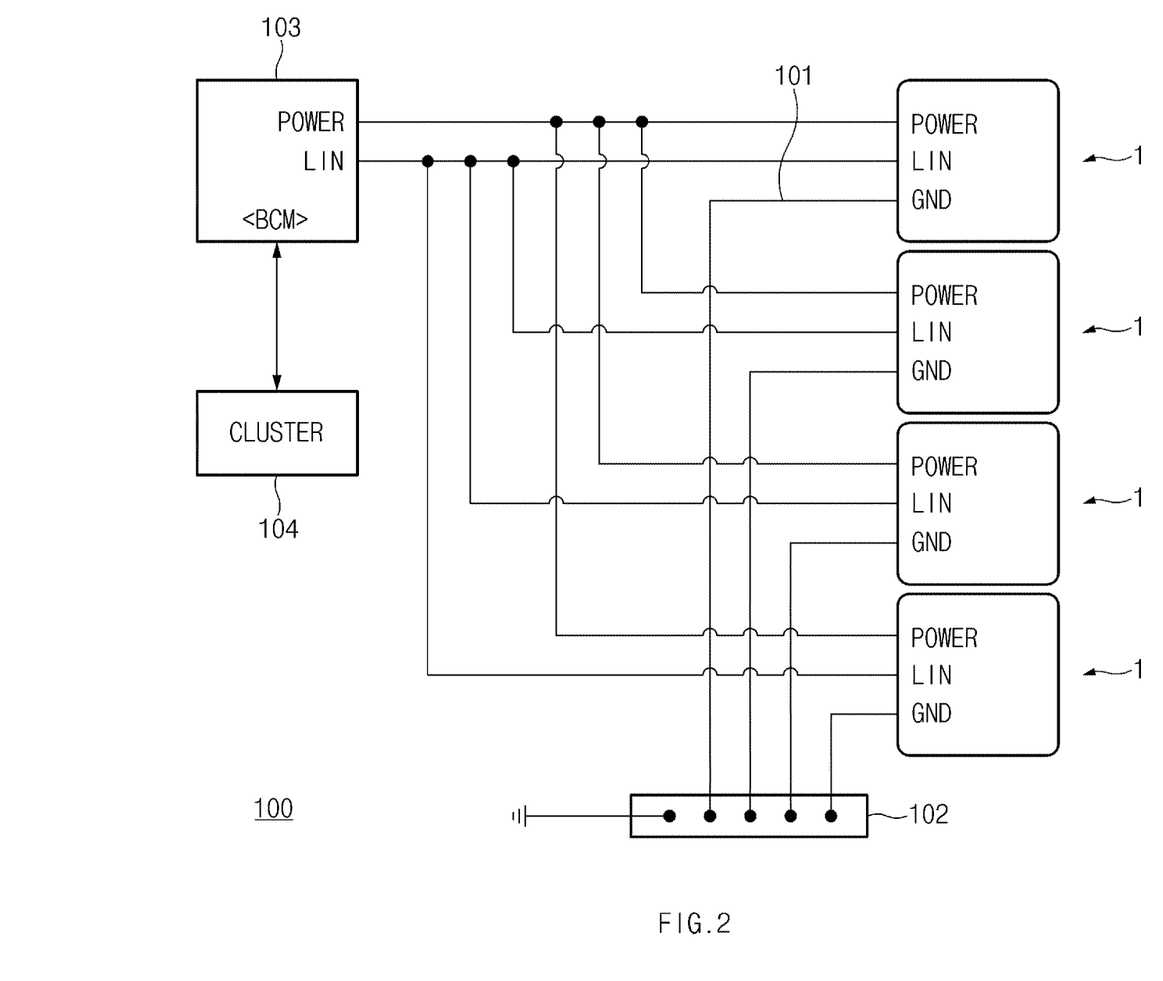
FIG. 2 is a conceptual diagram of a rear alarm sensor system.

FIG. 2 is a conceptual diagram of a rear alarm sensor system 100 in one form of the present disclosure.

Likewise to the system of FIG. 1, the rear alarm sensor system 100 in exemplary form of the present disclosure may include a body control module 103, a cluster 104, and a plurality of rear alarm sensor assemblies 1 similar to the rear alarm sensors 91 (see FIG. 1). However, each rear alarm sensor assembly 1 has only one ground terminal 25. Accordingly, the number of ground lines 101 connecting the ground terminal 25 (see FIG. 3) and a ground part 102 may be decreased, and therefore the rear alarm sensor system 100 may significantly reduce the cost, the size, and the failure probability, compared with the system of FIG. 1.

Figure 3:
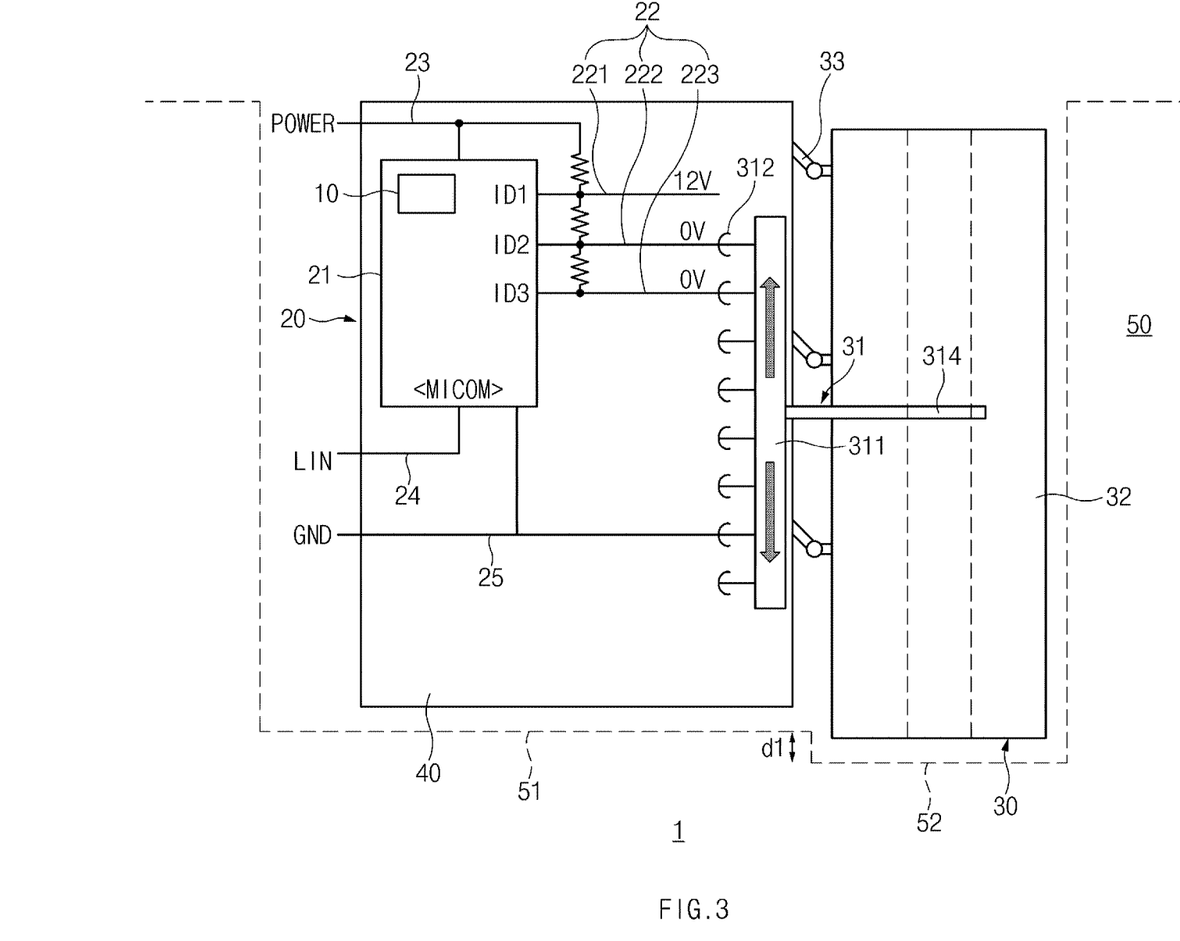
FIG. 3 is a conceptual diagram of a rear alarm sensor assembly.

FIG. 3 is a conceptual diagram of the rear alarm sensor assembly 1 according to an exemplary form of the present disclosure.

Referring to FIG. 3, the rear alarm sensor assembly 1 may include a sensing part 10, a controller 20, and a determination device 30. The rear alarm sensor assembly 1 may further include a housing 40. The housing 40 may accommodate and protect the sensing part 10 and the controller 20, which will be described below, and may be fixed to a bumper 50 of a vehicle using a fastener such as a bolt or a screw.

The sensing part 10 may generate a sensing signal, based on contents obtained by detecting an approaching object by generating waves. The sensing part 10 may include a sensor capable of detecting an adjacent object in a non-contact manner. An ultrasonic sensor using ultrasonic waves or an IR sensor using infrared light waves, which are electromagnetic waves, may be used as the sensor. However, the type of the sensor is not limited thereto.

The sensing part 10 may include a transmitter and a receiver and may cause waves generated and emitted from the transmitter to be reflected by an adjacent object. The reflected waves may be received by the receiver, and the sensing part 10 may generate a sensing signal based on the waves received by the receiver and may transmit the generated sensing signal to the controller 20. An encoder may be additionally connected to the receiver and may convert the sensing signal based on the received waves into a digital signal. The sensing part 10 may be accommodated in a controller body 21 as illustrated. However, the sensing part 10 may be located in a different area of the rear alarm sensor assembly 1.

The controller 20 may generate a transmission signal and may transmit the generated transmission signal to the body control module 103 (see FIG. 2). The transmission signal may include a sensing signal and an identifier for identification. The structure of the transmission signal may be the same as the contents described above with reference to FIG. 1. To receive and generate the signal, the controller 20 may be a microcontroller capable of performing logic operations. A central processing unit (CPU), a field programmable gate array (FPGA), or an application specific integrated circuit (ASIC) may be used as the controller 20. However, the type is not limited thereto. The controller 20 may include the controller body 21 accommodating the element.

To receive a sensing signal, the controller 20 may be electrically connected to the sensing part 10. Furthermore, to transmit a generated transmission signal to the body control module 103, the controller 20 may be connected to the body control module 103 through a signal transmission line 24 using LIN communication as illustrated in FIG. 2.

The controller 20 may include a plurality of identification terminals 22 for changing an identifier according to a connection relation. The controller 20 may generate different identifiers according to the types and number of identification terminals 22 electrically connected to the determination device 30, which will be described below, among the plurality of identification terminals 22. An identifier determined based on the arrangement of the determination device 30 will be described below with reference to FIGS. 5 to 7 together with FIG. 3. The number of identification terminals 22 may be three as illustrated: a first identification terminal 221, a second identification terminal 222, and a third identification terminal 223. However, the number of identification terminals 22 is not limited thereto.

A power line 23 for supplying power to the controller 20 may be connected to the controller 20. The power line 23 may also be connected to the identification terminals 22 and may allow a potential other than 0 V to be applied to the identification terminals 22 in some cases. When the power line 23 is connected to the identification terminals 22, resistors with predetermined magnitudes may be disposed.

The controller 20 may further include the ground terminal 25 that is grounded. The ground terminal 25 may be connected to the ground part 102 of the rear alarm sensor system 100 through the ground line 101. Accordingly, the ground terminal 25 may be grounded and may have a potential of 0 V, and another part electrically connected to the ground terminal 25 and having the same potential may also have a potential of 0 V.

The determination device 30 may change the connection relation of the plurality of identification terminals 22 by changing the method of making contact with the identification terminals 22. The determination device 30 may or may not be electrically connected to at least one of the plurality of identification terminals 22 as the determination device 30 moves, and may be electrically connected to the ground terminal 25 to change the connection relation between the identification terminals 22 and the ground terminal 25. The determination device 30 may move in the vertical direction of FIG. 3 and may be electrically connected to the specific identification terminals 22 and the ground terminal 25. Specific arrangements of the determination device 30 according to circumstances will be described below with reference to FIGS. 5 to 7 together with FIG. 3.

The determination device 30 in another form of the present disclosure may be movably coupled to the housing 40 through a hinge 33. Specifically, the determination device 30 may include a determination device housing 32 that protects other components of the determination device 30, similarly to the housing 40 that protects the sensing part 10 and the controller 20. The hinge 33 may be disposed between the determination device housing 32 and the housing 40. The determination device housing 32 and the housing 40 may be connected to the hinge 33 to move relative to each other. However, since the housing 40 is fixed to the bumper 50, the determination device housing 32 may be connected to the fixed housing 40 through the hinge 33 so as to be movable relative to the fixed housing 40. As the hinge 33 is folded or unfolded, the determination device housing 32 may move toward or away from the bumper 50 in the vertical direction of FIG. 3.

When the above-described hinge 33 is bent, the determination device 30 may move, and the determination device housing 32 may be brought into close contact with another portion 52 of the bumper 50 stepped from a portion 51 of the bumper 50 to which the housing 40 is fixed. In this state, the determination device 30 may be fixed to the bumper 50. Likewise to the housing 40, the determination device 30 may also be fixed to the bumper 50 using a fastener. The fastener may be connected to the determination device 30 and the other portion 52 of the bumper 50. Alternatively, the fastener may be connected to another inner surface of the bumper 50.

The determination device 30 may include a bus bar 31. The bus bar 31 may be formed of a conductor. The bus bar 31 may be electrically connected to the ground terminal 25 and may be electrically connected to the identification terminals 22. The entire bus bar 31 may be accommodated in the determination device housing 32. However, as illustrated, a bus bar connector 314, which is a portion of the bus bar 31, may be accommodated in the determination device housing 32, and a bus bar body 311, which is another portion of the bus bar 31, may be located inside the housing 40 and may make contact with the ground terminal 25 and the identification terminals 22.

Figure 4:
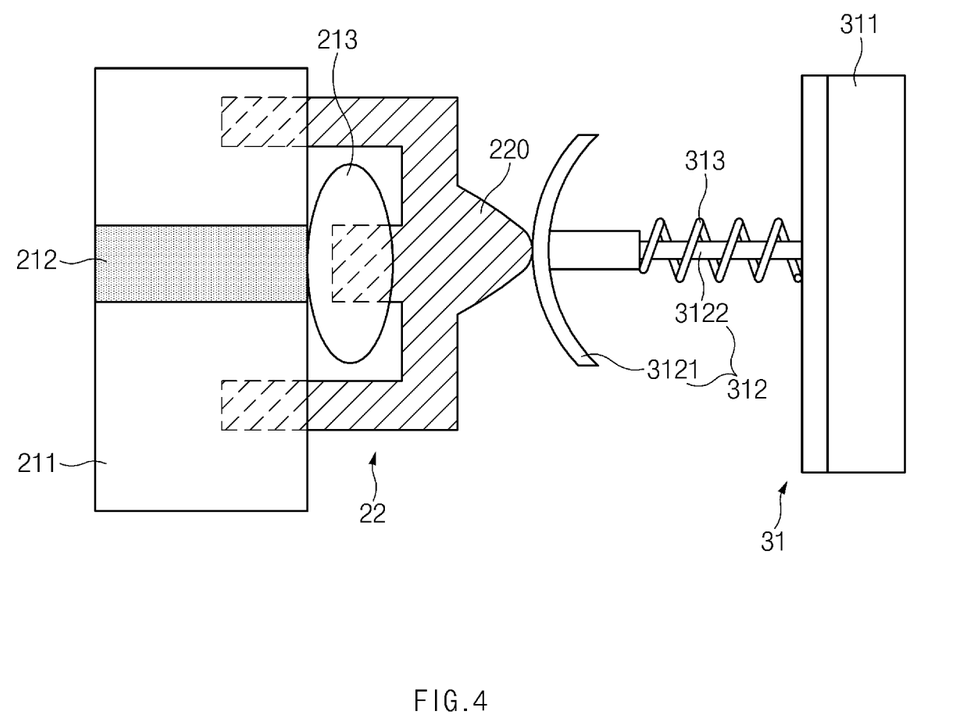
FIG. 4 is a detailed view illustrating contact between an identification terminal and a bus bar of the rear alarm sensor assembly.

FIG. 4 is a detailed view illustrating contact between the identification terminal 22 and the bus bar 31 of the rear alarm sensor assembly 1 in one form of the present disclosure.

Referring to FIG. 4, the bus bar 31 may include a contact terminal 312 making contact with the identification terminal 22 and an elastic member 313 exerting a restoring force on the contact terminal 312 toward the identification terminal 22. A plurality of contact terminals 312 may be arranged along the longitudinal direction of the bus bar body 311. The contact terminal 312 may protrude from the bus bar body 311 toward the identification terminal 22 and may maintain an electrically connected state. The contact terminal 312 may further protrude from the bus bar body 311 along the direction in which the contact terminal 312 protrudes, or may be pressed by the identification terminal 22 so that a portion of the contact terminal 312 may enter the bus bar body 311. The elastic member 313 with elasticity may be disposed between the contact terminal 312 and the bus bar body 311 to allow the contact terminal 312 to make contact with the corresponding identification terminal 22 without separation therefrom.

Specifically, the identification terminal 22 may be bonded and connected to a circuit pattern 212 formed on a substrate 211 included in the controller 20, through a conductor 213 of metal such as lead. Furthermore, other portions of the identification terminal 22 may be fit into the substrate 211. As illustrated, the identification terminal 22 may have an identification protrusion 220 protruding toward the determination device 30. The identification protrusion 220 may make contact with the contact terminal 312. The circuit pattern 212 may be electrically connected to a circuit embedded in the controller body 21 of the controller 20.

The contact terminal 312 may have a head 3121 formed of a conductor and formed to be concave toward the identification terminal 22 as illustrated and a leg 3122 connected to the bus bar body 311. The elastic member 313 may be disposed between the head 3121 of the contact terminal 312 and the bus bar body 311. The elastic member 313 may be compressed when the contact terminal 312 is pressed toward the bus bar body 311, and may be extended to exert a restoring force on the identification terminal 22 when the contact terminal 312 moves toward the identification terminal 22.

The length of the elastic member 313 in the state in which no external force is applied to the elastic member 313 may be a length by which the elastic member 313 supports the contact terminal 312 to allow the contact terminal 312 to contact the identification terminal 22 when the hinge 33 is unfolded to the maximum. Accordingly, the identification terminal 22 and the contact terminal 312 may make contact with each other even in the state in which the bus bar 31 is farthest away from the identification terminal 22. The state in which the bus bar 31 is farthest away from the identification terminal 22 is illustrated in FIG. 5.

The bus bar 31 may not move leftward or rightward when being moved by the determination device housing 32 in the vertical direction in the drawing. Accordingly, the bus bar connector 314 may be movably coupled to the determination device housing 32 to allow the bus bar 31 to move leftward or rightward relative to the determination device housing 32.

Figure 6:
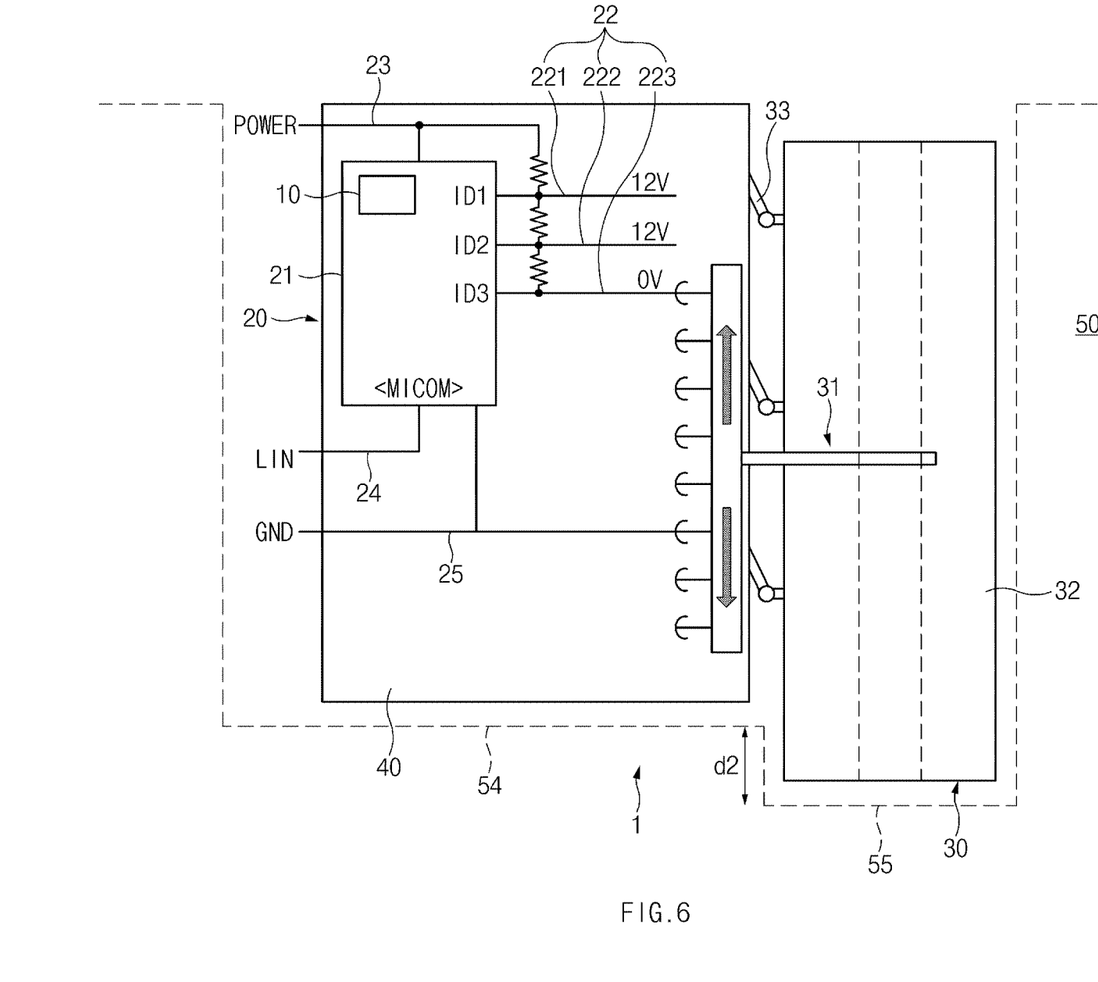
Figure 7:
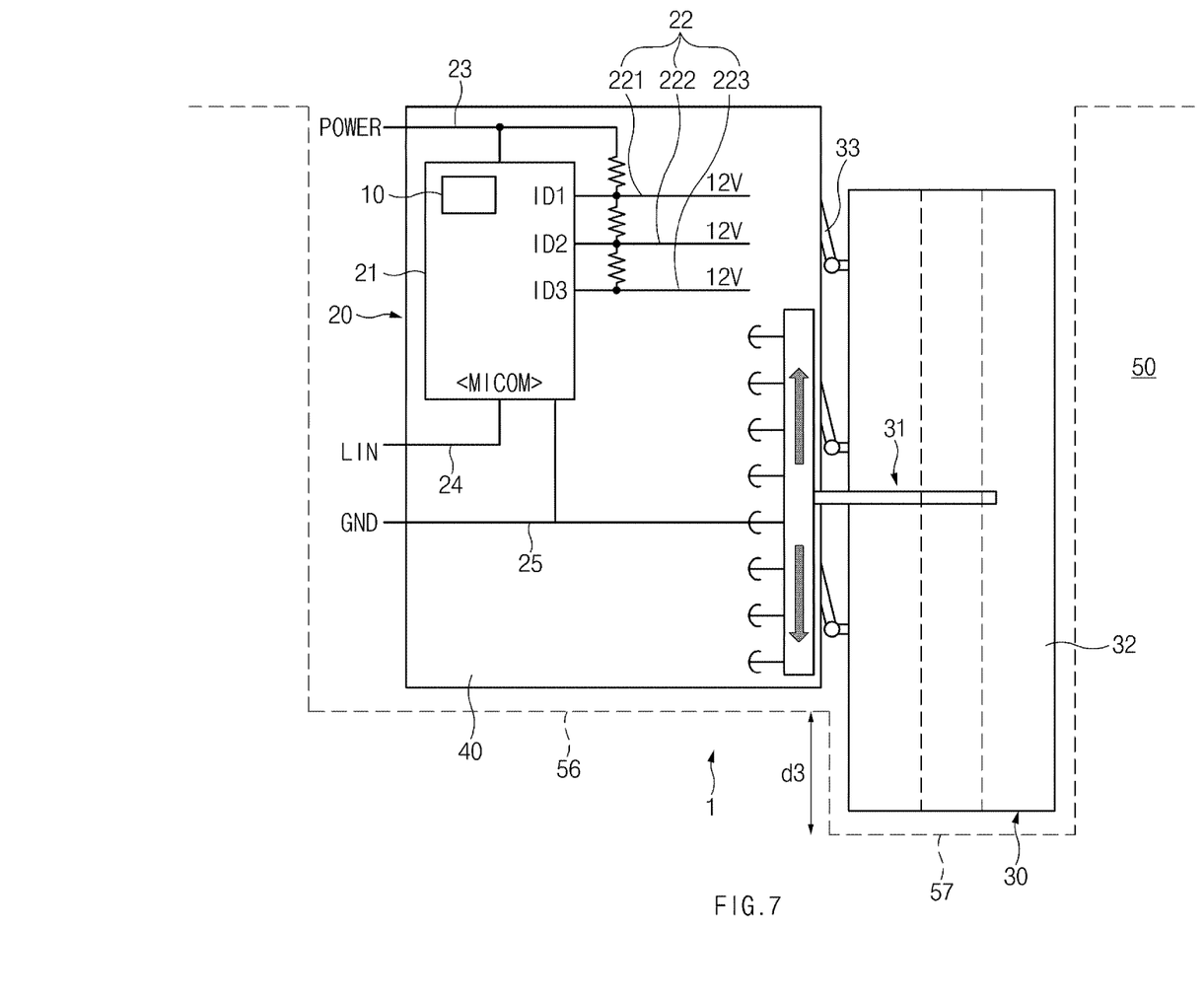

Hereinafter, various connection states of the rear alarm sensor assembly 1 in the exemplary forms of the present disclosure will be described with reference to FIGS. 3 and 5 to 7. FIGS. 5 to 7 are conceptual diagrams illustrating various connection states of the rear alarm sensor assembly 1.

Figure 5:
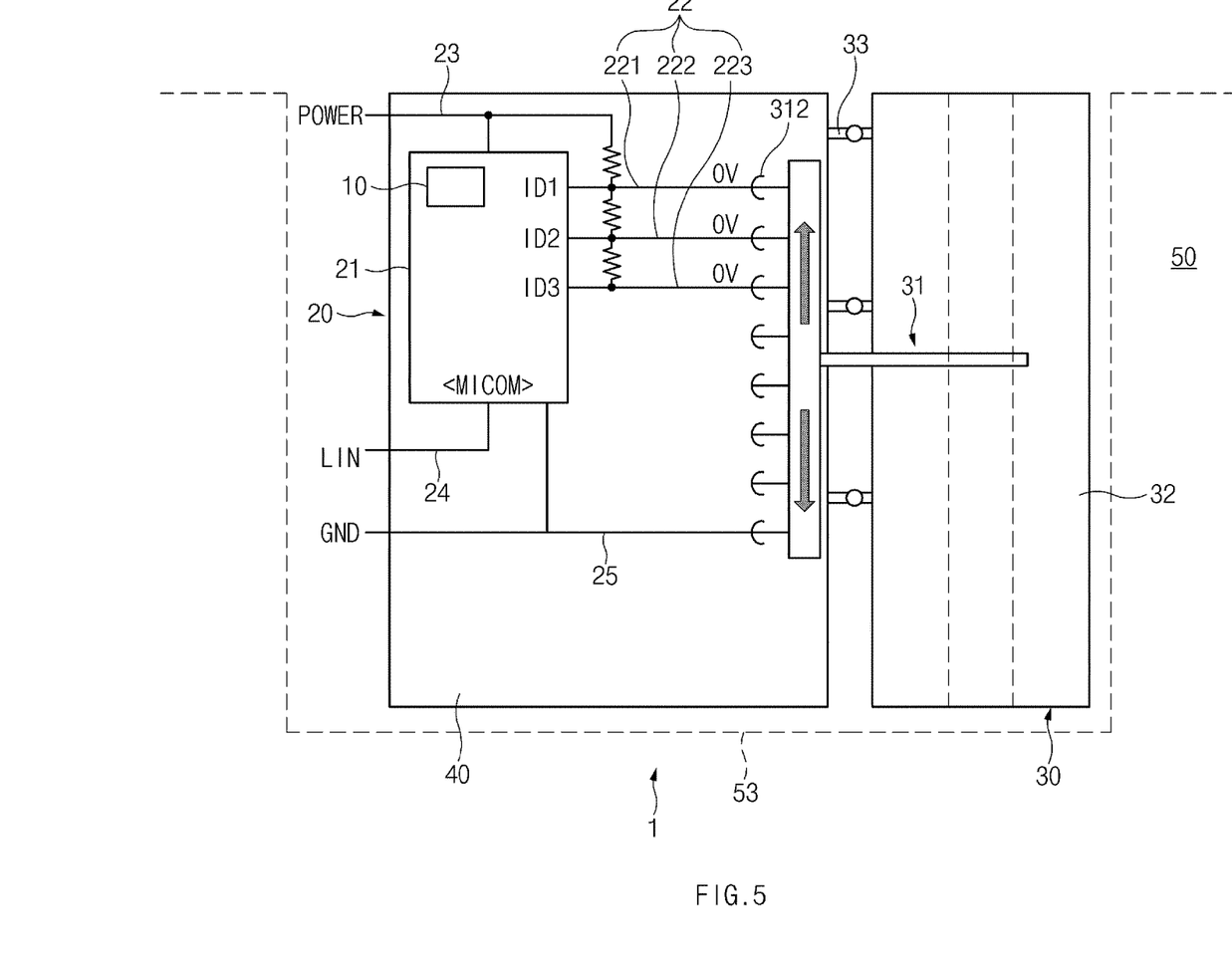
FIGS. 5 to 7 are conceptual diagrams illustrating various connection states of the rear alarm sensor assembly.

Referring to FIG. 5, the rear alarm sensor assembly 1 may be disposed in a concave area 53 of the bumper 50 where no step is formed on the inner surface. In this case, the hinge 33 connecting the housing 40 and the determination device housing 32 may be unfolded in a straight line to the maximum. When the determination device 30 is disposed as illustrated in FIG. 5, the contact terminals 312 of the determination device 30 may be connected to all of the identification terminals 22 and the ground terminal 25. Accordingly, all of the identification terminals 22 may be grounded, and therefore the identifier of the rear alarm sensor assembly 1 in this position that the controller 20 recognizes may be 000.

Referring to FIG. 3, the rear alarm sensor assembly 1 may be disposed in a concave area of the bumper 50 where a step of d1 is formed between the portion 51 of the bumper 50 to which the housing 40 is fixed and the other portion 52 of the bumper 50 to which the determination device 30 is fixed. In this case, the hinge 33 connecting the housing 40 and the determination device housing 32 may be bent to bring the determination device 30 into close contact with the other portion 52 of the bumper 50 and fix the determination device 30 thereto. When the determination device 30 is disposed as illustrated in FIG. 3, the contact terminals 312 of the determination device 30 may not make contact with the first identification terminal 221, but may be connected to the second identification terminal 222, the third identification terminal 223, and the ground terminal 25. Accordingly, the second identification terminal 222 and the third identification terminal 223 may be grounded, and voltage may be applied to the first identification terminal 221 through the power line 23. Therefore, the identifier of the rear alarm sensor assembly 1 in this position that the controller 20 recognizes may be 100.

Referring to FIG. 6, the rear alarm sensor assembly 1 may be disposed in a concave area of the bumper 50 where a step of d2 is formed between a portion 54 of the bumper 50 to which the housing 40 is fixed and another portion 55 of the bumper 50 to which the determination device 30 is fixed. Here, the step d2 may be greater than the step d1. In this case, the hinge 33 connecting the housing 40 and the determination device housing 32 may be more bent than in the case of FIG. 3 to bring the determination device 30 into close contact with the other portion 55 of the bumper 50 and fix the determination device 30 thereto. When the determination device 30 is disposed as illustrated in FIG. 6, the contact terminals 312 of the determination device 30 may not make contact with the first identification terminal 221 and the second identification terminal 222, but may be connected to the third identification terminal 223 and the ground terminal 25. Accordingly, the third identification terminal 223 may be grounded, and voltage may be applied to the first identification terminal 221 and the second identification terminal 22 through the power line 23. Therefore, the identifier of the rear alarm sensor assembly 1 in this position that the controller 20 recognizes may be 110.

Referring to FIG. 7, the rear alarm sensor assembly 1 may be disposed in a concave area of the bumper 50 where a step of d3 is formed between a portion 56 of the bumper 50 to which the housing 40 is fixed and another portion 57 of the bumper 50 to which the determination device 30 is fixed. Here, the step d3 may be greater than the step d2. In this case, the hinge 33 connecting the housing 40 and the determination device housing 32 may be more bent than in the case of FIG. 6 to bring the determination device 30 into close contact with the other portion 57 of the bumper 50 and fix the determination device 30 thereto. When the determination device 30 is disposed as illustrated in FIG. 7, the contact terminals 312 of the determination device 30 may not make contact with all of the identification terminals 22. Accordingly, voltage may be applied to all of the identification terminals 22 through the power line 23, and therefore the identifier of the rear alarm sensor assembly 1 in this position that the controller 20 recognizes may be 111.

Since the identifiers in the different areas of the bumper 50 described with reference to the drawings are differently generated, when the cluster 104 (see FIG. 2) receives a transmission signal generated from each rear alarm sensor assembly 1 and informs a user of the transmission signal, the user may recognize which rear alarm sensor assembly 1 generates the signal.

Figure 8:
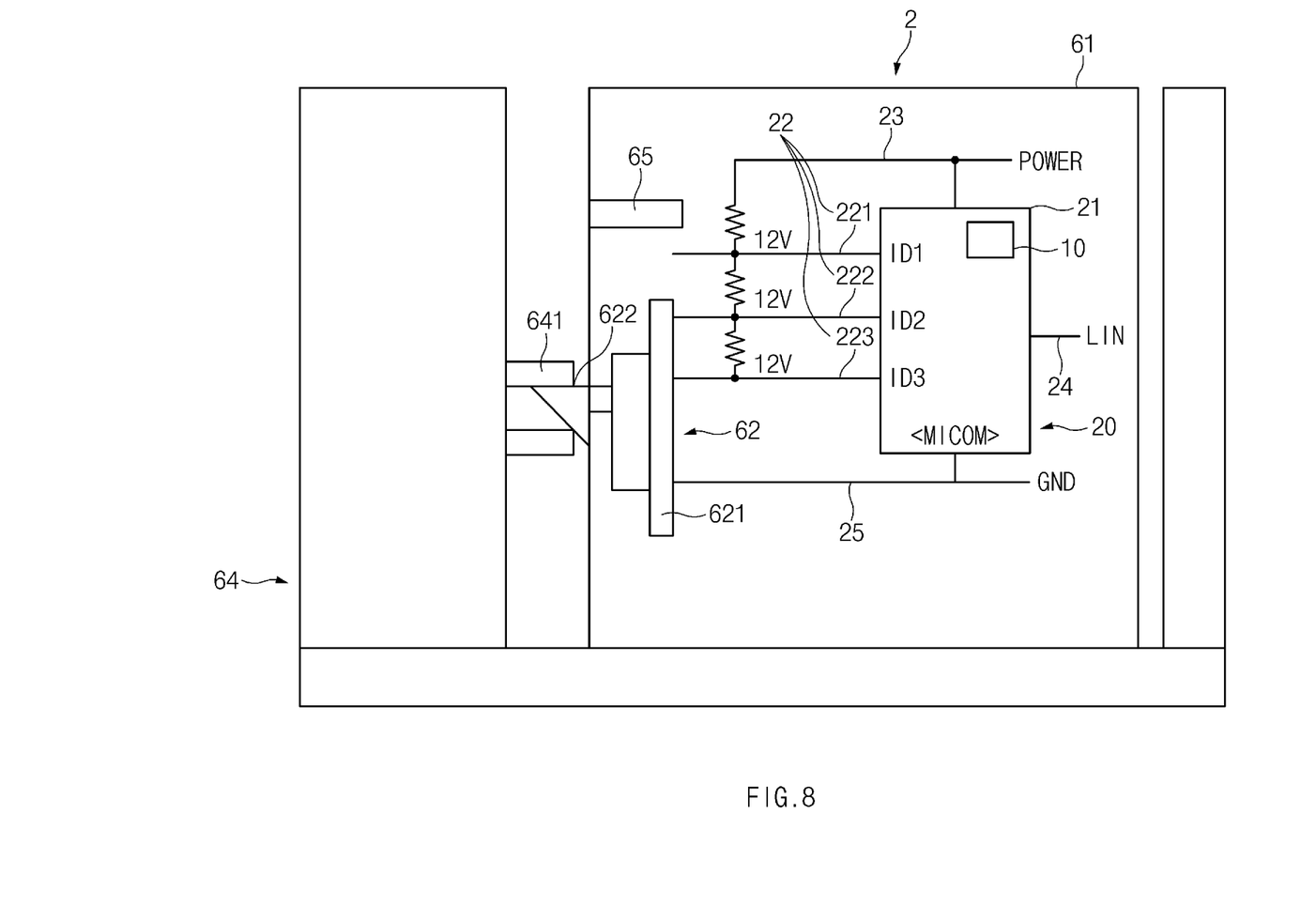
FIGS. 8 and 9 are conceptual diagrams of a rear alarm sensor assembly.
Figure 9:
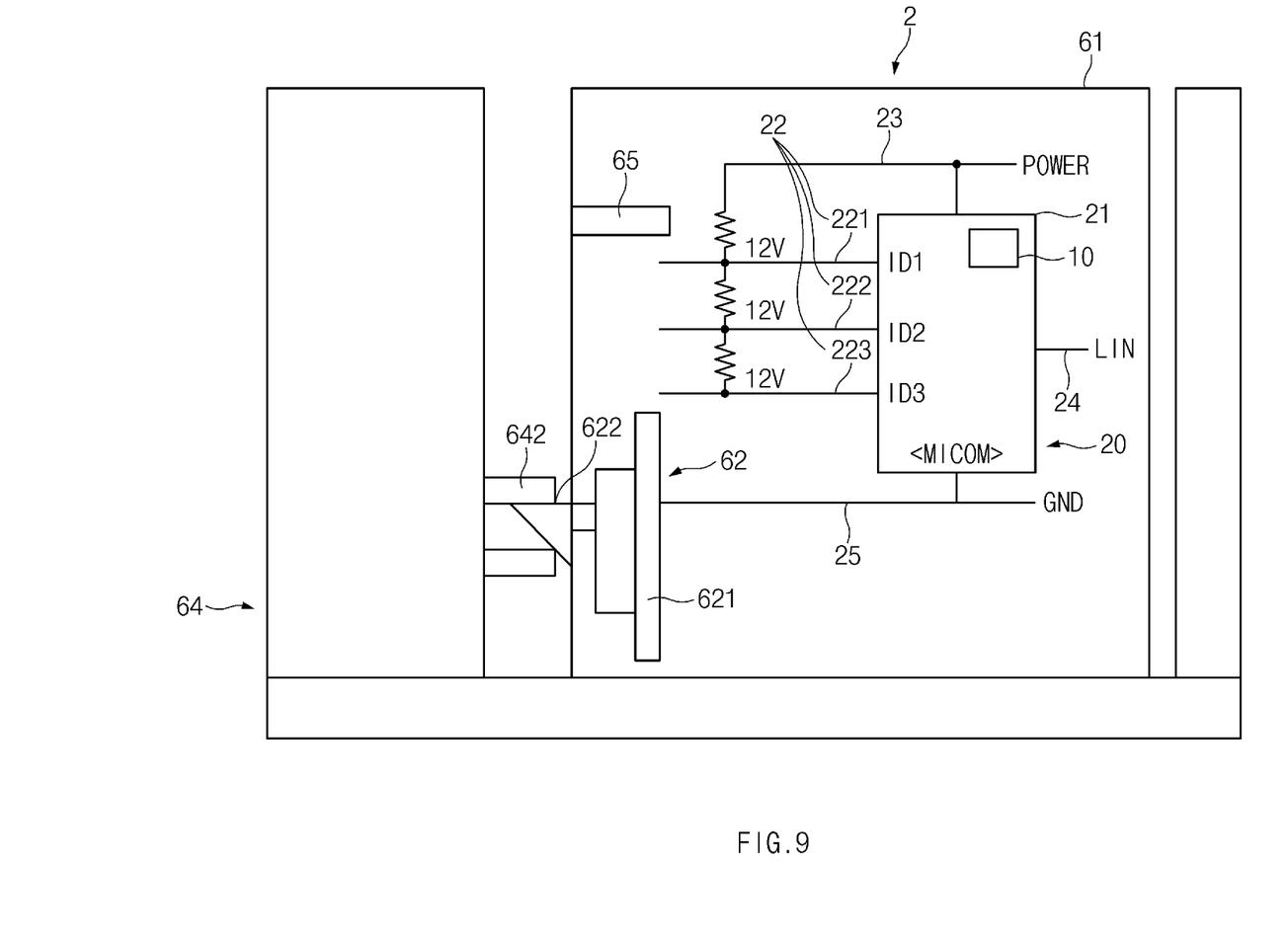

FIGS. 8 and 9 are conceptual diagrams of a rear alarm sensor assembly 2 in another form of the present disclosure.

Referring to FIGS. 8 and 9, the rear alarm sensor assembly 2 may include the sensing part 10 and the controller 20. Therefore, descriptions of the sensing part 10 and the controller 20 may be replaced with the contents described above. A housing 61 may be connected to a bumper 64 and may further accommodate a determination device 62.

The determination device 62 may be accommodated in the housing 61 and may move relative to the housing 61 to change the connection relation of the identification terminals 22 and the ground terminal 25, with a portion of the determination device 62 protruding outside the housing 61. Specifically, the determination device 62 may include a fixing part 622 coupled to a bumper contact part 641 or 642 formed in the bumper 64. The fixing part 622 may be the above-described portion of the determination device 62 that protrudes outside the housing 61. One of the bumper contact part 641 or 642 and the fixing part 622 may have a protruding shape, and the other may have a shape by which the one is fixedly stopped. Although it has been illustrated in the drawings that the fixing part 622 has a protruding shape and the bumper contact part 641 or 642 has an inner space where the fixing part 622 is received and coupled, the shapes are not limited thereto.

The bumper contact parts 641 and 642 may be formed on the inner surface of the bumper 64. The bumper contact parts 641 and 642 may be formed at different heights according to each position of the bumper 64. Accordingly, the rear alarm sensor assembly 2 in other form of the present disclosure, which is formed in different positions of the bumper 64, may have the fixing part 622 in different positions. This is because the fixing part 622 has to move so as to be coupled with the bumper contact parts 641 and 642 at different heights.

The connection relation of the identification terminals 22 may be changed as the fixing part 622 moves so as to be coupled with the bumper contact part 641 or 642. The bumper contact part 641 of FIG. 8 may be located in a higher position in the drawing than the bumper contact part 642 of FIG. 9. In FIG. 8, the fixing part 622 may be located such that a bus bar 621 of the determination device 62 does not make contact with the first identification terminal 221, but makes contact with the second identification terminal 222, the third identification terminal 223, and the ground terminal 25, and in FIG. 9, the fixing part 622 may be located such that the bus bar 621 of the determination device 62 makes contact with only the ground terminal 25. Accordingly, in FIG. 8, an identifier of 100 may be generated, and in FIG. 9 an identifier of 111 may be generated. In addition, different identifiers may be generated according to the heights of the bumper contact parts 641 and 642.

The rear alarm sensor assembly 2 according to the other form of the present disclosure may further include a blocking part 65 inside the housing 61. The blocking part 65 may inhibit or prevent the determination device 62 from moving beyond a predetermined range. The blocking part 65 may physically inhibit or prevent the determination device 62 from moving upward beyond the position where the determination device 62 makes contact with the first identification terminal 221 in FIGS. 8 and 9.

Figure 10:
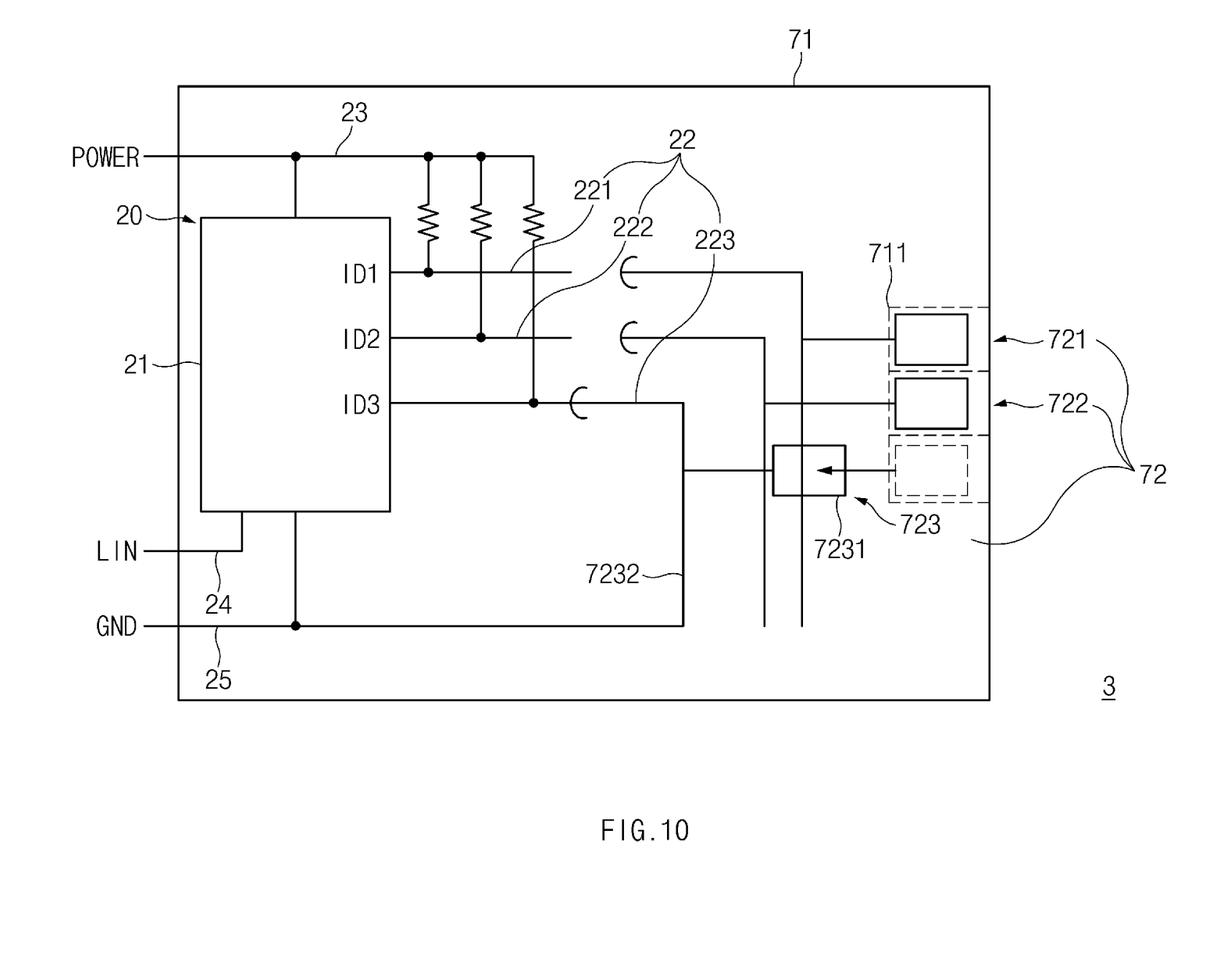
FIG. 10 is a conceptual diagram of a rear alarm sensor assembly.
Figure 11:
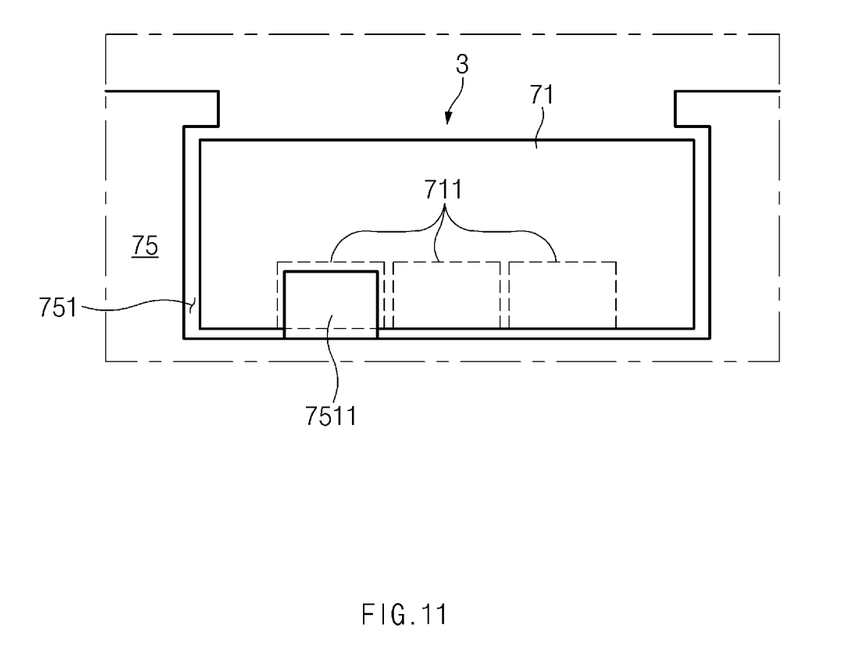
FIGS. 11 and 12 are conceptual diagrams illustrating various situations in which the rear alarm sensor assembly is mounted on a bumper.
Figure 12:
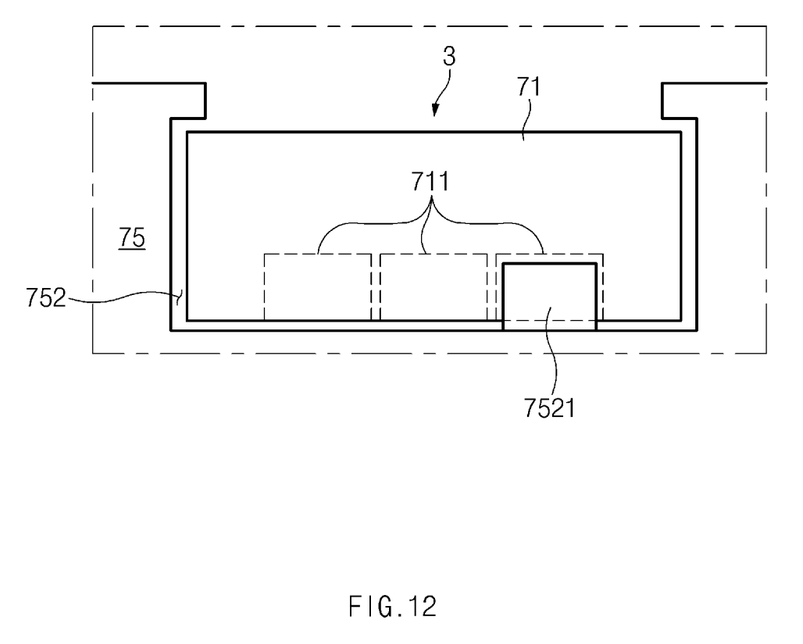

FIG. 10 is a conceptual diagram of a rear alarm sensor assembly 3 according to another form of the present disclosure. FIGS. 11 and 12 are conceptual diagrams illustrating various situations in which the rear alarm sensor assembly 3 according to other form of the present disclosure is mounted on a bumper 75.

Referring to FIGS. 10 to 12, the rear alarm sensor assembly 3 may include the sensing part 10 and the controller 20 as in the above-described forms of the present disclosure. Therefore, descriptions of the sensing part 10 and the controller 20 may be replaced with the contents described above. A housing 71 according to another form may be connected to a bumper 75 and may further accommodate a plurality of determination devices 72.

The plurality of determination devices 72 of the rear alarm sensor assembly 3 may be electrically connected to the ground terminal and may be connected to at least one of the plurality of identification terminals 22 to electrically connect the connected identification terminal 22 and the ground terminal 25, thereby changing the connection relation of the plurality of identification terminals 22. A determination device head 7231 included in one of the plurality of determination devices 72 may be pressed by a bumper protrusion 7511 or 7521 of the bumper 75, and a determination device connector 7232 connected to the pressed determination device head 7231 and formed of a conductor may be electrically connected to the ground terminal 25 and may be connected to at least one of the plurality of identification terminals 22. Although the determination devices 72 are illustrated as including a total of three determination devices (first to third determination devices 721, 722, and 723), the number of determination devices 72 is not limited thereto. Alternatively, any one of the plurality of determination devices 72 may be electrically connected to only the ground terminal 25 and may not be connected to the identification terminals 22.

In the situation illustrated in FIG. 10, the third determination device 723 may be pressed by one of the bumper protrusions 7511 an 7521 to make contact with the third identification terminal 223 and the ground terminal 25. Since the first identification terminal 221 and the second identification terminal 222 do not make contact with the third determination device 723 and only the third identification terminal 223 is grounded, the rear alarm sensor assembly 3 of FIG. 10 may have an identifier of 110. The first determination device 721 and the second determination device 722 may make contact with the identification terminals 22 different from the identification terminal 22 making contact with the third determination device 723, or may make contact with the same identification terminal 22 and may additionally make contact with the different identification terminals 22, to generate different identifiers.

The bumper protrusion 7511 formed in a concave area 751 of the bumper 75 illustrated in FIG. 11 may be formed in a different position than the bumper protrusion 7521 formed in a concave area 752 of the bumper 75 illustrated in FIG. 12. When the rear alarm sensor assembly is assembled in the concave area of the bumper 75, the bumper protrusion 7511 or 7521 may be inserted into the housing 71 to press one of the plurality of determination devices 72 to allow the ground terminal 25 and at least one of the plurality of identification terminals 22 to make contact with the pressed determination device 72. Depending on the place where the rear alarm sensor assembly 3 is installed in the bumper 75, the different determination devices 72 may be pressed by the bumper protrusions 7511 and 7521 disposed in different positions, and therefore the rear alarm sensor assembly 3 may have different identifiers. Furthermore, the housing 71 may have open areas 711 formed therein. The open areas 711 may be recessed, or may be open toward the bumper protrusions 7511 and 7521, such that the bumper protrusions 7511 and 7512 are inserted into the open areas 711.

According to the exemplary forms of the present disclosure, the number of ground lines used for ground may be reduced, thereby achieving space and cost savings and reducing a field failure rate due to contact trouble or wiring disconnection.

Hereinabove, even though all of the constituent components are coupled into one body or operate in a combined state in the description of the above-mentioned forms of the present disclosure, the present disclosure is not limited to these forms. That is, all of the constituent components may operate in one or more selective combination within the range of the purpose of the present disclosure. It should be also understood that the terms of "include", "comprise" or "have" in the specification are "open type" expressions just to say that the corresponding constituent components exit and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:
1. A rear alarm sensor assembly comprising:
a sensing part configured to generate waves and a sensing signal, based on contents obtained by detecting an approaching object by the generated waves;
a controller configured to generate a transmission signal including the sensing signal and an identifier for identification and transmit the generated transmission signal to a body control module, the controller including a plurality of identification terminals for changing the identifier based on a connection relation and a ground terminal that is grounded; and a determination device electrically connected to the ground terminal and configured to move so as not to be connected to the plurality of identification terminals or so as to be connected to at least one identification terminal of the plurality of identification terminals, wherein the determination device is configured to electrically connect the at least one connected identification terminal and the ground terminal to change the connection relation of the plurality of identification terminals.

2. The rear alarm sensor assembly of claim 1, further comprising:

a housing configured to accommodate the sensing part and the controller, the housing fixed to a bumper, wherein the determination device is movably coupled to the housing through a hinge.

3. The rear alarm sensor assembly of claim 2, wherein, as the hinge is bent, the determination device is brought into close contact with another portion of the bumper stepped from a portion of the bumper to which the housing is fixed, and the determination device is fixed to the bumper.

4. The rear alarm sensor assembly of claim 1, wherein the determination device includes:

a bus bar formed of a conductor and electrically connected to the ground terminal and the at least one identification terminal of the plurality of identification terminals; and a determination device housing fixed to a bumper and configured to accommodate the bus bar.

5. The rear alarm sensor assembly of claim 4, wherein the bus bar includes a contact terminal configured to make contact with the at least one identification terminal of the plurality of identification terminals, and an elastic member configured to provide a restoring force to the contact terminal toward the at least one identification terminal of plurality of identification terminals.

6. The rear alarm sensor assembly of claim 1, wherein the controller is configured to generate different identifiers based on types and a number of identification terminals electrically connected to the determination device among the plurality of identification terminals.

7. The rear alarm sensor assembly of claim 1, further comprising:

a housing fixed to a bumper and configured to accommodate the sensing part, the controller, and the determination device, wherein the determination device includes a fixing part coupled to a bumper contact part formed in the bumper, wherein the connection relation of the identification terminals is changed as the fixing part moves so as to be coupled to the bumper contact part, and wherein one of the bumper contact part and the fixing part has a protruding shape, and the other has a shape configured to fixedly stop one of the bumper contact part and the fixing part.

8. A rear alarm sensor assembly installed in a bumper, the assembly comprising:

a sensing part configured to generate waves and a sensing signal, based on contents obtained by detecting an approaching object by the generated waves;

a controller configured to generate a transmission signal including the sensing signal and an identifier for identification and transmit the generated transmission signal to a body control module, the controller including a plurality of identification terminals for changing the identifier based on a connection relation and a ground terminal that is grounded; and a plurality of determination devices electrically connected to the ground terminal and connected to at least one identification terminal of the plurality of identification terminals to electrically connect the at least one connected identification terminal and the ground terminal to change the connection relation of the plurality of identification terminals, wherein at least one determination device of the plurality of determination devices is pressed by a bumper protrusion included in a bumper, is electrically connected to the ground terminal, and is connected to the at least one identification terminal of the plurality of identification terminals.

9. The assembly of claim 8, wherein the at least one determination device of the plurality of determination devices includes a determination device head pressed by the bumper protrusion and a determination device connector formed of a conductor and connected to the determination device head, and wherein the determination device connector is configured to move so as to be electrically connected to the ground terminal and the at least one identification terminal of the plurality of identification terminals when the determination device head is pressed and moved.

* * * * *